United States Patent
Yoshioka

[19]

[11] Patent Number: 6,059,680
[45] Date of Patent: May 9, 2000

[54] SPEED SENSITIVE ON-DEMAND TORQUE COUPLING DIFFERENTIAL

[75] Inventor: Jun Yoshioka, Fort Wayne, Ind.

[73] Assignee: Dana Corporation, Toledo, Ohio

[21] Appl. No.: 09/296,395

[22] Filed: Apr. 23, 1999

[51] Int. Cl.[7] .................................................. F16H 48/20
[52] U.S. Cl. ............................... 475/88; 475/86; 475/231
[58] Field of Search ............................... 475/82–88, 231, 475/237

[56] References Cited

U.S. PATENT DOCUMENTS

| | | |
|---|---|---|
| 4,012,968 | 3/1977 | Kelbel . |
| 4,934,213 | 6/1990 | Niizawa ...................................... 475/86 |
| 4,938,306 | 7/1990 | Sumiyoshi . |
| 5,135,071 | 8/1992 | Shibahata . |
| 5,141,072 | 8/1992 | Shibahata . |
| 5,161,636 | 11/1992 | Haupt et al. . |
| 5,184,695 | 2/1993 | Matsuda et al. . |
| 5,302,158 | 4/1994 | Kwasniewski ........................... 475/160 |
| 5,398,792 | 3/1995 | Teroaka . |
| 5,484,033 | 1/1996 | Frank et al. . |
| 5,520,589 | 5/1996 | Dewald et al. ........................... 475/231 |
| 5,938,555 | 8/1999 | Leeper ....................................... 475/88 |
| 5,951,426 | 9/1999 | Forrest ....................................... 475/88 |

*Primary Examiner*—Khoi Q. Ta
*Attorney, Agent, or Firm*—Liniak, Berenato, Longacre & White

[57] ABSTRACT

An axle case assembly is provided with a speed sensitive torque coupling mechanism used to transmit torque from the ring gear to a planetary differential assembly. The differential assembly provides torque transfer proportional to the speed difference between the ring gear sub-assembly and a planetary gear set sub-assembly, wherein the invention splits a differential case assembly into two primary pieces and a speed sensitive mechanism is installed between each piece. The mechanism is entirely contained inside an axle differential case assembly. An optional limited slip device may be provided for the differential gears. The torque transmission coupling assembly eliminates the need for a center differential in the transfer case, i.e. an interaxle differential, thereby reducing the driveline complexity and cost without requiring a separate torque coupling in the transfer case or in-line with the driveline.

10 Claims, 13 Drawing Sheets

SPEED SENSITIVE ON-DEMAND TORQUE COUPLING DIFFERENTIAL

BACKGROUND OF THE INVENTION a) Field of the Invention

The present invention relates to a full time-four-wheel-drive vehicle in which front and rear wheels are always connected to each other through a torque transmission coupling.

b) Description of Related Art

Torque applied to a tire through a drive shaft propels a vehicle by the friction between the tire and the surface of the road for the vehicle. Occasionally, slip takes place between the road surface and the tire. The ratio of the slip depends on the coefficient of friction between the tire and the road surface. The coefficient of friction fluctuates due to the states of the road surface and the tire, the grounding load upon the tire, the magnitude of the torque transmitted to the tire, the driving speed of the vehicle, and so forth.

As for an ordinary two-wheel-drive vehicle, high torque is transmitted to each driving wheel through a transmission at the start of the vehicle so that a large slip could take place between the road surface and the tire of the wheel. The torque transmitted through the transmission decreases as the driving speed of the vehicle rises, so that the ratio of the slip falls.

When the torque transmitted to the tire is so high that the tire slips, the torque does not fully act to propel the vehicle, resulting in wasted motive power, lowered fuel efficiency, and adverse vehicle handling.

When the fluctuation in the coefficient of friction is large or the coefficient of friction is very small, as on a muddy road, a partially icy road, a snowy road, a graveled road, or the like, the stability of movement of the vehicle is reduced and the stopping distance increases in the case of locking of the wheel in braking. Moreover, it is sometimes difficult to maintain the direction of movement of the vehicle in the case of locking of the rear wheel (in particular, in braking).

For the above-mentioned reasons, four-wheel-drive vehicles have become popular vehicles for driving on a wide range of road conditions. In four-wheel-drive vehicles, the driving power of an engine is dividedly transmitted to four wheels to eliminate the above-mentioned drawbacks and problems.

Since a rotation speed difference arises between the front and rear wheels of the four-wheel-drive vehicle due to the turning radius difference between the front and the rear wheels at the time of turning of the vehicle, torsional torque is caused (a tight corner braking phenomenon) between the drive shafts for the front and the rear wheels if the turning is performed on a high-friction-coefficient road (such as a paved road), on which the driving wheel and the surface of the road are less likely to slip relative to each other. For that reason, different types of four-wheel-drive vehicles have been developed in order to prevent the deterioration of the moving property of each vehicle due to the torsional torque, the increase in the wear of the tire, the shortening of the life of the vehicle, and so forth.

One of the different types of four-wheel-drive vehicles is a part time four-wheel-drive vehicle in which the driver shifts from the four-wheel drive mode to the two-wheel drive mode when running on a high-friction-coefficient road such as a paved road. Another type of four-wheel-drive vehicle is a full time-four-wheel-drive or all-wheel-drive vehicle equipped with a center differential unit for dividedly transmitting motive power to a front and a rear wheel drive shafts. Another type of four-wheel-drive vehicle is a full time-four-wheel-drive vehicle in which the front or rear wheels are always driven and in which the rear or front wheels are driven through a viscous clutch which transmits torque by the viscosity of silicone oil or the like.

Although the part time-four-wheel-drive vehicle can be manufactured at a relatively low cost, it is troublesome to shift between the two-wheel drive and the four-wheel drive and it is likely that the vehicle is slowly turned when the driver mistakenly fails to properly choose between four-wheel drive and two-wheel drive. It is less likely that every driver can precisely predict the occurrence of slip of the driving wheel and take appropriate action.

Full time-four-wheel-drive vehicle, that are equipped with the center differential unit, have a front wheel drive differential unit, which dividedly transmits motive power to the right and left front wheels, and a rear wheel drive differential unit, which dividedly transmits motive power to the right and left rear wheels. These full-time four-wheel-drive vehicles suffer from a problem that no motive power is transmitted to any of the remaining three of four driving wheels when one wheel is caused to spin or loses the tire grip due to overhanging on the road side or ditch, a slip on an icy road, or the like. For that reason, the center differential unit is provided with a differential locking mechanism. The differential locking mechanism is of the mechanical type or the electronic control type. In the mechanical type, a differential rotation which takes place in the center differential unit is stopped through manual shifting when no motive power is transmitted to the three of the four driving wheels in order to put the vehicle into the state of direct-connection four-wheel drive. In the electronic control type, the speed of the vehicle, the angle of turning of the vehicle, the racing of the drive shaft, and so forth are detected by sensors in order to put the differential locking mechanism into a locking or unlocking state through an electronic controller. As for the mechanical type, it is difficult to set a differential locking start time point, the time point cannot be changed depending on the moving condition of the vehicle, and it is more difficult to automate the differential locking mechanism. As for the electronic control type, a device for controlling the differential locking mechanism is more complex and the cost of production of the mechanism is very high.

Since the center differential unit comprises an input shaft which receives motive power transmitted from an engine through a transmission, a differential case connected to the input shaft, a pinion shaft which is driven by the differential case, pinions rotatably attached to the peripheral surface of the pinion shaft, a first side gear which is engaged with the pinion and connected to a first differential means for driving the front or rear wheels, a second side gear which is engaged with the pinion and connected to a second differential means for driving the rear or front wheels, and the differential locking mechanism which engages the differential case and the side gear with each other through mechanical operation or electronic control, the cost of production of the center differential unit is very high and the weight of the vehicle is increased.

It is also known to replace the aforementioned center differential with a torque transmission coupling that includes an input shaft drivingly connected to the transmission and a first differential, an output shaft drivingly connected to a second differential, an oil pump driven by the relative rotation between the input and the output shafts to generate oil pressure corresponding to the speed of the relative rotation, and a friction clutch mechanism engaging the input shaft and the output shaft with each other by the oil pressure generated by the oil pump. The torque transmitted by the torque coupling is proportional to the speed of the relative rotation. When the rotation speed of the wheels driven by the first differential is higher than that of the wheels driven by the second differential, a rotation speed difference takes place between the input and the output shafts. The oil pump generates the oil pressure corresponding to that rotation speed difference. The oil pressure is applied to the friction clutch mechanism so that torque is transmitted from the input shaft to the output shaft depending on the magnitude of the oil pressure. When torque is transmitted to the second differential, the rotation speed of the wheels drivingly connected to the second differential is raised to approach that of the wheels driven by the first differential, thereby reducing the rotation speed difference between the input and the output shafts. In short, the torque transmission coupling operates in response to the rotation speed difference that takes place depending on the environmental situation of the vehicle and the moving conditions thereof. In other words, a prescribed slip is always allowed.

The conventional torque coupling assemblies, however, suffer from drawbacks inherent in their assembly and location within the vehicle drivetrain. Conventional torque coupling assemblies are installed in the transfer case or in-line with the driveline or driveshaft.

The need therefore exists for a torque coupling assembly that eliminates the need for a center differential in the transfer case, i.e. an interaxle differential, thereby reducing the driveline complexity and cost without requiring a separate torque coupling in the transfer case or in-line with the driveline.

SUMMARY OF THE INVENTION

The present invention was made in consideration of the above-described circumstances. Accordingly, it is an object of the present invention to provide a four-wheel-drive vehicle which does not have the above-described drawbacks and problems and fulfills the functions of four-wheel drive under all conditions and whose constitution and cost are simple and low, respectively.

The present invention provides an axle case assembly with a speed sensitive mechanism used to transmit torque from the ring gear to a planetary differential housing. The inventive differential assembly provides torque transfer proportional to the speed difference between the ring gear sub-assembly and a planetary gear set sub-assembly, wherein the invention splits a differential case assembly into two primary pieces and a speed sensitive mechanism is installed between each piece. In the preferred embodiment, the mechanism is entirely contained inside an axle differential assembly. An optional limited slip device may be provided for the differential gears.

The primary features, structures and objectives of the invention will be more fully understood with reference to the following description and drawings.

DETAILED DESCRIPTION OF THE PREFERRED EMBODIMENT

Figure 1:
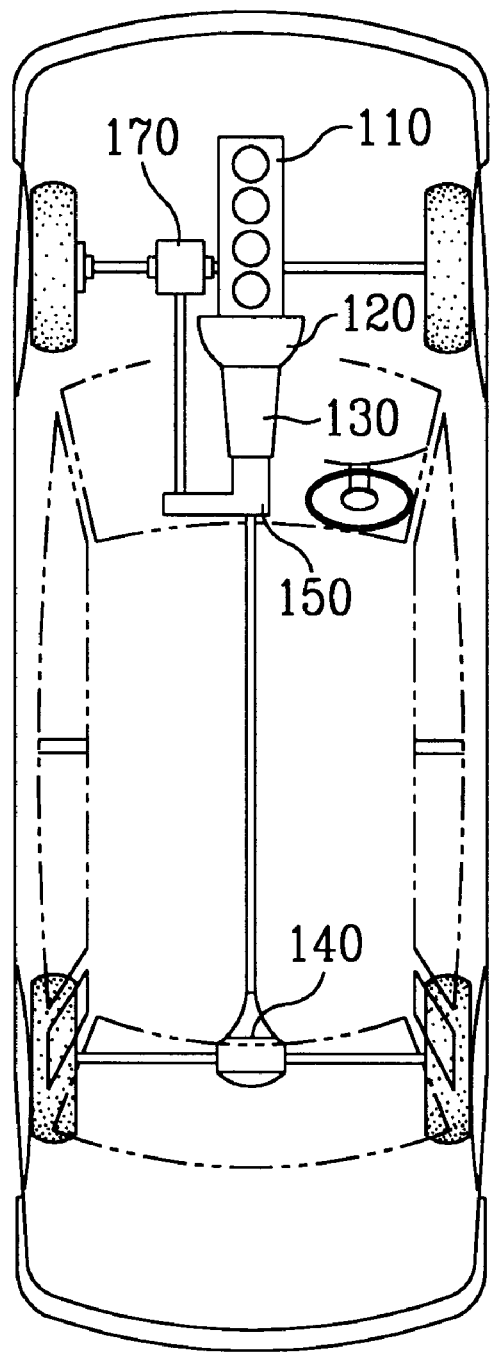
FIG. 1 is a schematic view of a four-wheel-drive vehicle incorporating the torque coupling assembly of this invention.

With reference to FIG. 1, the four-wheel-drive vehicle provided in accordance with the present invention comprises an engine 110, a transmission 130 which is driven through a clutch 120 by the engine 110 to change the speed of the output rotation of the engine 110. A transfer case 150 divides torque transmission between a first differential means 140 that drives one of a front and a rear wheel systems and a second differential means 170 that drives the other of the front and the rear wheel systems.

A torque transmission coupling 200 is provided between a ring gear and a planetary differential housing. The torque transmission coupling 200 comprises an oil pump that is driven by the relative rotation between the ring gear sub-assembly and a planetary gear set sub-assembly to generate oil pressure corresponding to the speed of the relative rotation. A friction clutch mechanism engages the ring gear sub-assembly and the differential gear set sub-assembly with each other by the oil pressure generated by the oil pump. The torque transmission coupling has such a property that the torque transmitted by the coupling is proportional to the speed of the relative rotation.

Figure 2:
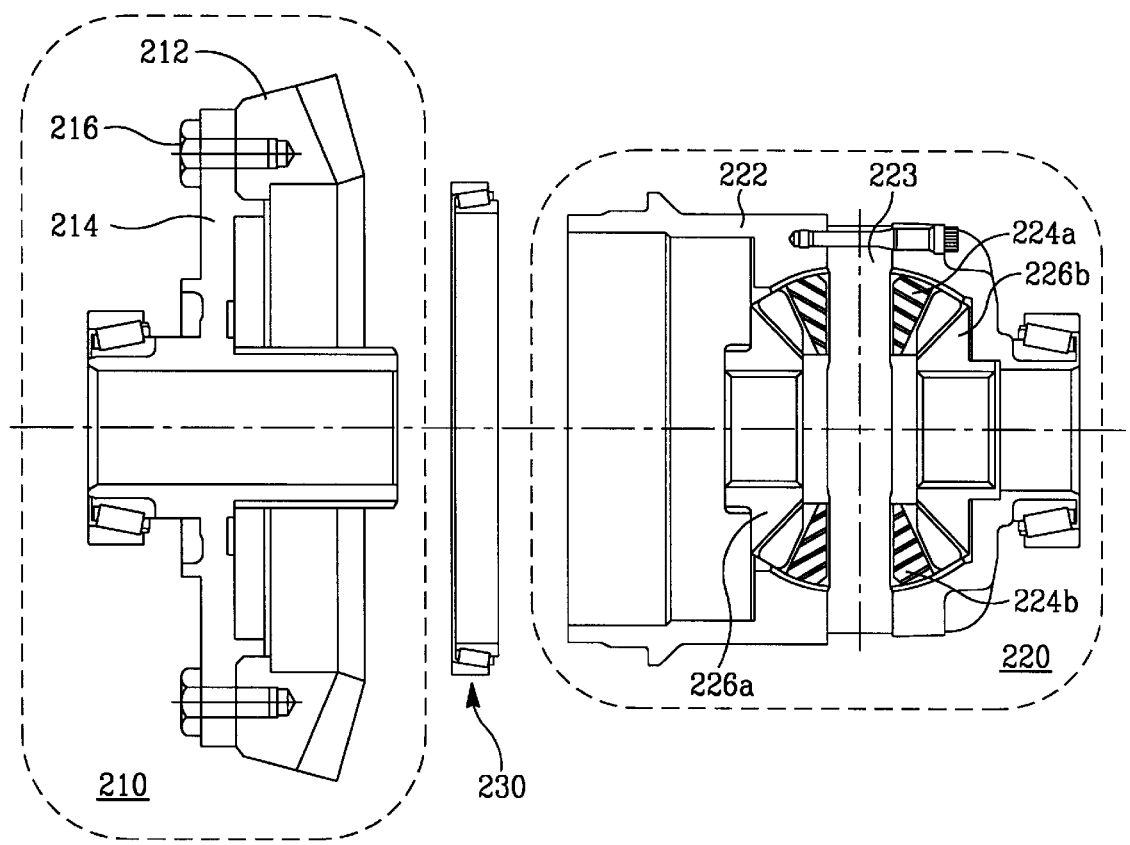
FIG. 2 is a partially exploded view showing the ring gear assembly, the bearing assembly and the differential assembly of the invention with the speed sensitive torque coupling device omitted.
Figure 3:
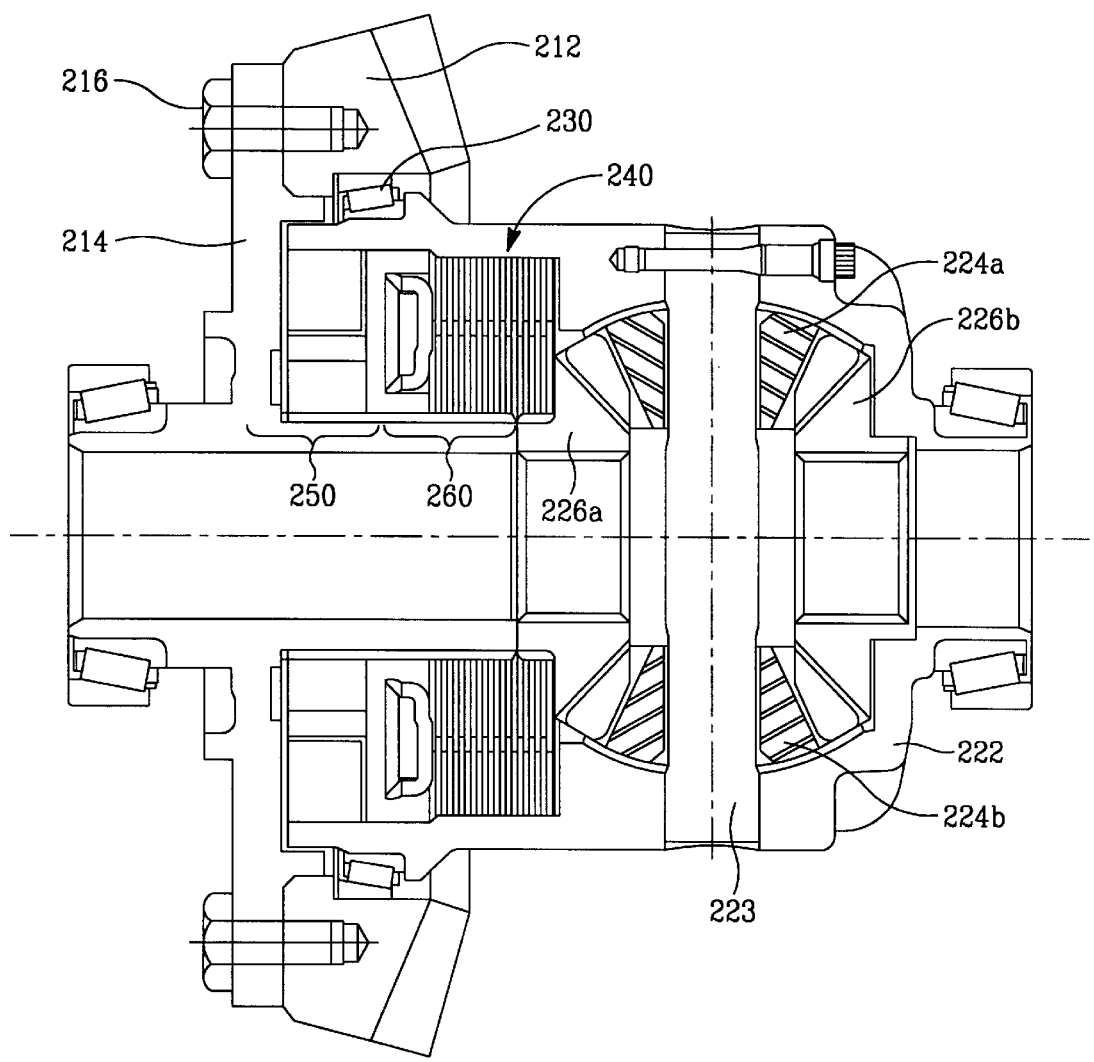
FIG. 3 is a view of the torque coupling and differential assembly of FIG. 2 shown in the assembled state with a pump system and clutch pack interposed between the ring gear sub-assembly and the differential sub-assembly.

With reference to FIGS. 2 and 3, the torque coupling assembly 200 comprises a ring gear sub-assembly 210, a differential sub-assembly 220, and a bearing sub-assembly 230 (see FIG. 2). The ring gear subassembly 210 includes a ring gear 212 fastened to a side case member 214 via fasteners 216. While FIG. 3 shows fasteners 216 in the form of bolts fixing the ring gear 212 to the side case member 214, it will be understood that various fastening assemblies may be employed without departing from the objectives of this invention. The differential sub-assembly 220 comprises a differential case 222, a shaft 223 driven by the rear differential case 222, pinions 224a, 224b rotatably attached to the peripheral surface of the shaft 223, and side gears 226a, 226b engaged with the pinions 224. The side gears 226a, 226b drive the right and left axles (not shown in FIG. 3).

Interposed between the ring gear sub-assembly 210 and the differential sub-assembly 220 is a bearing assembly 230 which permits relative rotation between the ring gear sub-assembly 210 and the differential sub-assembly 220.

Further provided between the ring gear sub-assembly 210 and the differential sub-assembly 220 is a speed-sensitive torque coupling assembly, shown generally as assembly 240. The speed-sensitive torque coupling assembly 240 included in the preferred embodiment of the present invention comprises a fluid pump 250 and a clutch pack 260. The fluid pump shown and described herein is a Gerotor type pump of the automatically reversible unidirectional flow type. The specific structure of the fluid pump 250 and clutch pack 260 will be described below.

With the assembly of FIGS. 2 and 3, a torque coupling assembly is provided within the axle differential case assembly. Therefore, when the rotation speed of the wheels driven by the first differential 140 is higher than that of the wheels driven by the second differential 170, a rotation speed difference takes place. In that case, the pump 250 generates the oil pressure corresponding to that rotation speed difference. The oil pressure is applied to the friction clutch mechanism 260 so that torque is properly distributed between the first differential 140 and the second differential 170 depending on the magnitude of the oil pressure. When the torque is transmitted to the second differential 170, the rotation speed of the wheels drivingly connected to the second differential 170 is raised to approach that of the wheels driven by the first differential 140, thereby reducing the rotation speed difference between the front and rear wheels.

In the low speed running of the vehicle, the absolute value of the speed of rotation transmitted to the first differential 140 is small, and the rotation speed of the ring gear sub-assembly 210 is therefore small as well. Even if the speed of the rotation of the differential sub-assembly 220 output shaft is zero or very low, the absolute value of the rotation speed difference between the sub-assemblies 210, 220 is small. In addition, the rising of the oil pressure generated by the oil pump at the low rotation speed is generally slow due to the internal leak of the pump. For these reasons, the torque transmitted through the friction clutch mechanism 260 is very low, so that the ring gear sub-assembly and the differential sub-assembly are allowed to slip relative to each other. As a result, torsional torque caused between a front and a rear wheel drive shafts at the time of slow turning of the vehicle is absorbed by the friction clutch mechanism 260 to prevent a tight corner braking phenomenon.

In the high speed running of the vehicle, if the rotation speed of the wheels driven by the second differential 170 is even slightly lower than that of the wheels driven by the first differential 140, the absolute value of the rotation speed difference between the ring gear sub-assembly 210 and the differential sub-assembly is certain to increase, because the absolute value of the speed of rotation transmitted to the first differential 140 is large in proportion to the driving speed of the vehicle. Therefore, the torque transmitted through the friction clutch mechanism 260 is also high, corresponding to the absolute value of the rotation speed difference between the ring gear sub-assembly 210 and the differential sub-assembly 220 shafts so that these shafts are maintained in a torque transmission state approximate to a directly connected state. For that reason, in the rapid running of the vehicle, the torque of the engine is transmitted to the front and the rear wheels, while the torque is divided nearly at a ratio of 50:50 between them, so that the stability of the running of the vehicle and the fuel efficiency thereof are enhanced.

Since the second differential 170 is always connected to the first differential 140 through the torque transmission coupling 240, it is not necessary to perform troublesome shifting between two-wheel drive and four-wheel drive as is done in the conventional part time-four-wheel-drive vehicle.

When some driving wheel slips during the running of the vehicle provided in accordance with the present invention, the rotation speed difference between the ring gear sub-assembly 210 and differential sub-assembly 220 of the torque transmission coupling increases immediately so that the oil pressure corresponding to the rotation speed difference increases. Consequently, the friction clutch mechanism 260 immediately acts to prevent the increase in the rotation speed difference between the ring gear sub-assembly 210 and the differential sub-assembly 220 to keep the slipping driving wheel from skidding sideways. Excess torque is transmitted to the other non-slipping driving wheels instead of the slipping driving wheel, so that the torque of the engine transmitted through the transmission is dividedly transmitted to the first and the second differentials 140, 170. Appropriate driving forces are thus automatically and constantly applied to the front and the rear driving wheels with good response.

Figure 4:
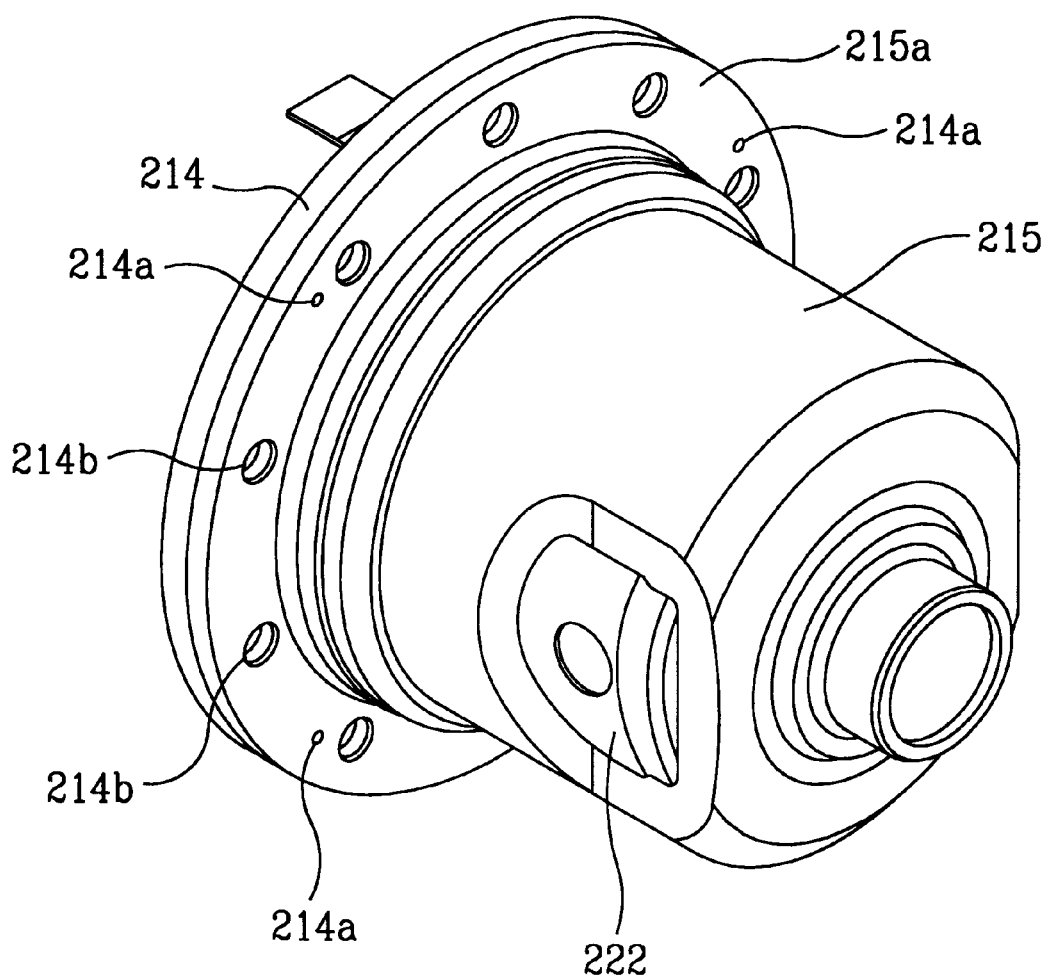
FIG. 4 is a perspective view of the axle differential case housing the torque coupling assembly of this invention.
Figure 5:
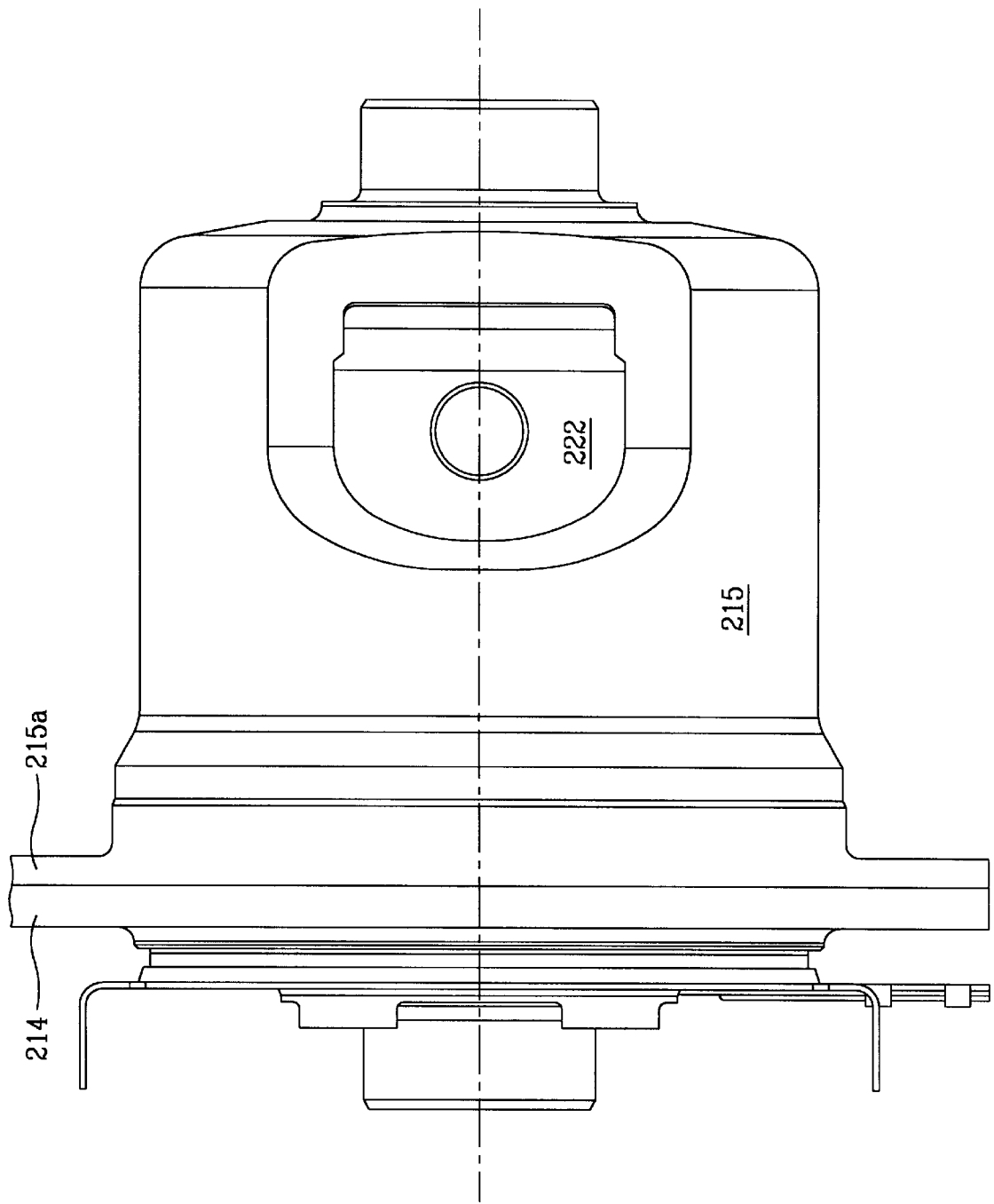
FIG. 5 is a side view of the axle differential and torque coupling assembly shown in FIG. 4.

With reference to FIGS. 4–13, a specific embodiment of the invention will now be described. FIG. 4 is a perspective view of the preferred embodiment of the invention in an assembled state, and FIG. 4 shows the differential case 222 disposed within an outer housing 215 which is affixed to the side housing 214. The bolt holes 214a pass through both the side case member 214 and a flange 215a formed on the outer housing 215. Apertures 214b are provided to receive bolts 216 to mount a ring ger (not shown) to the side housing 214 and the outer housing 215. FIG. 5 is a side view of the torque coupling differential of FIG. 4.

Figure 6:
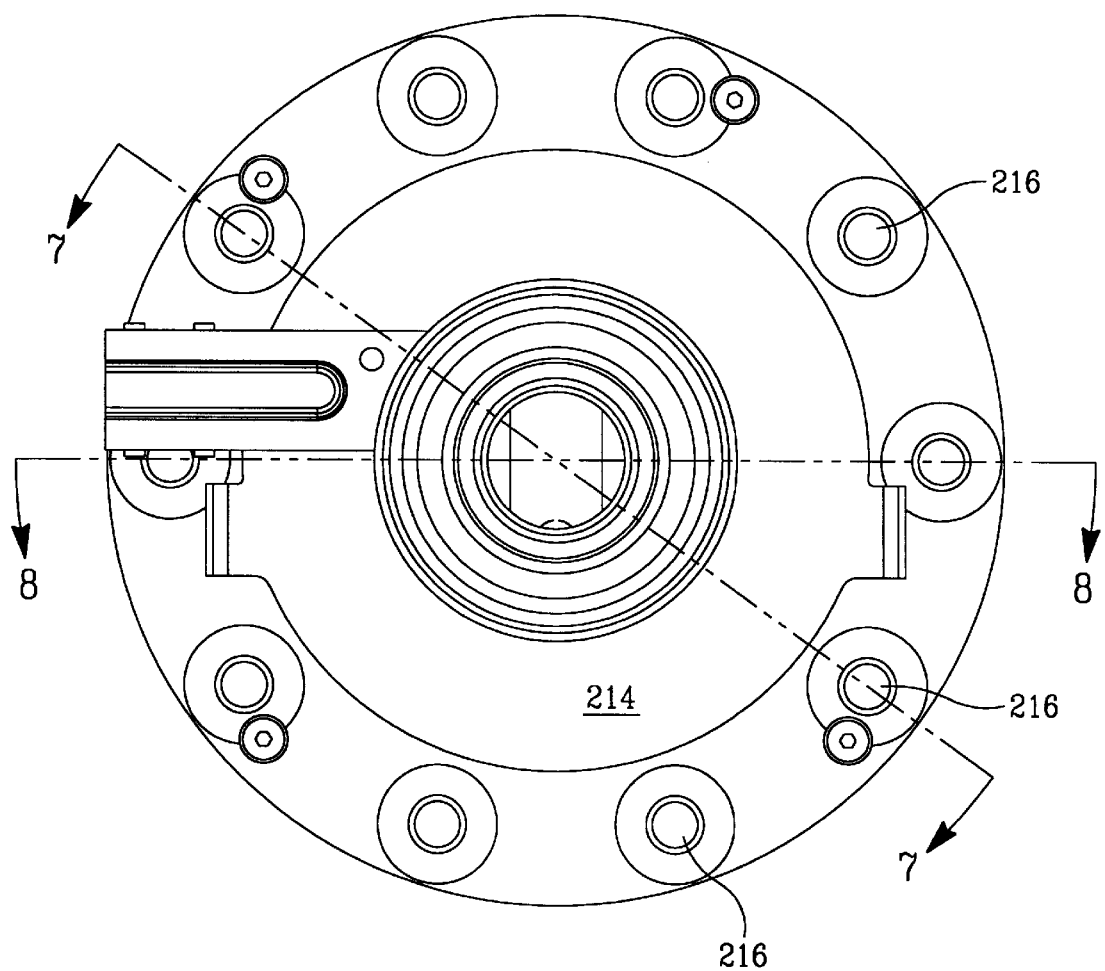
FIG. 6 is a left-end view of the differential and torque coupling assembly shown in FIG. 5.

FIG. 6 is a left side view of the torque coupling differential of FIG. 5 illustrating the side housing 214 and bolts 216 mounted within the bolt holes 214b.

Figure 7:
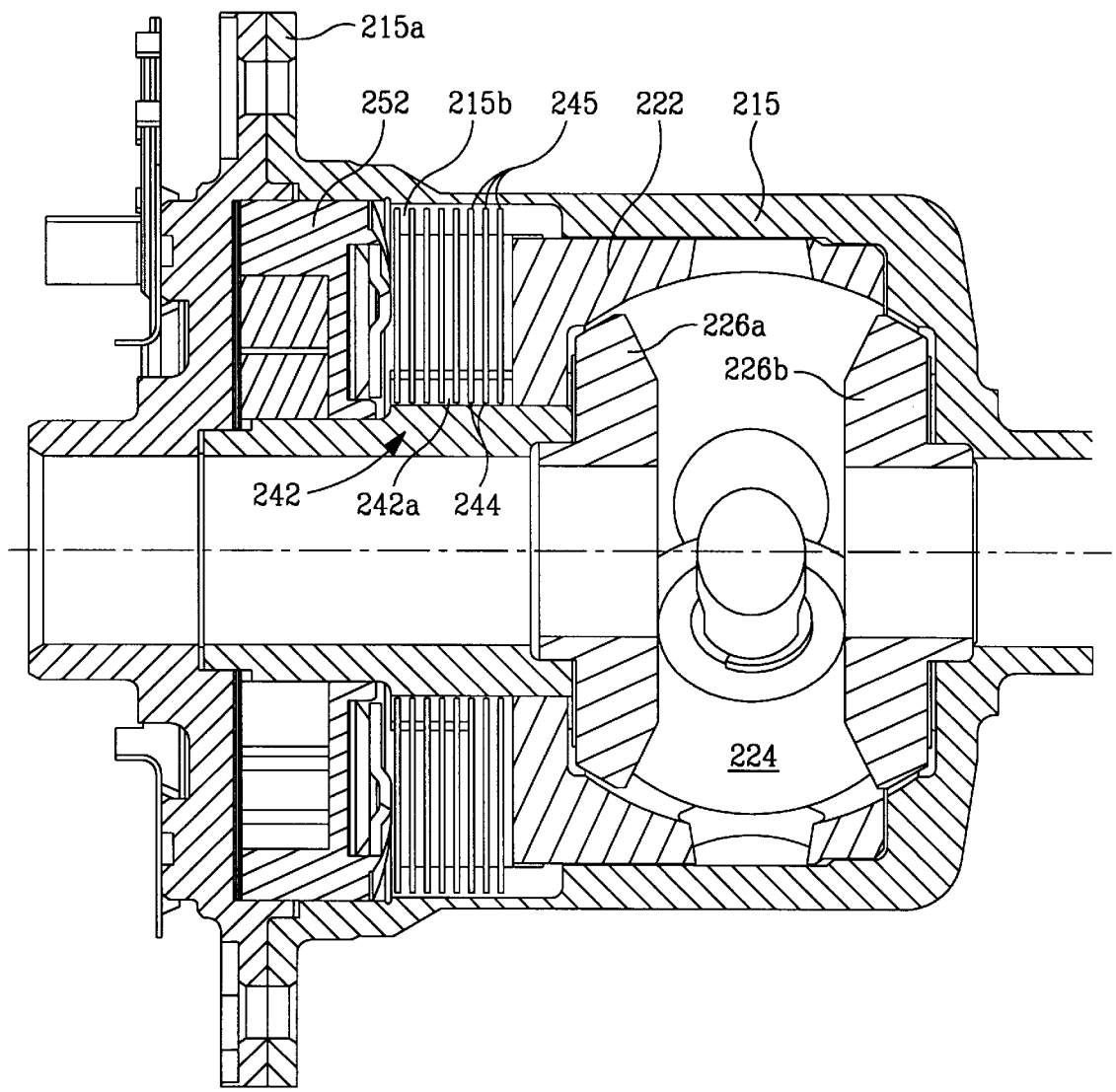
FIG. 7 is a sectional view of the differential and torque coupling assembly as viewed along section line VII—VII of FIG. 6.
Figure 8:
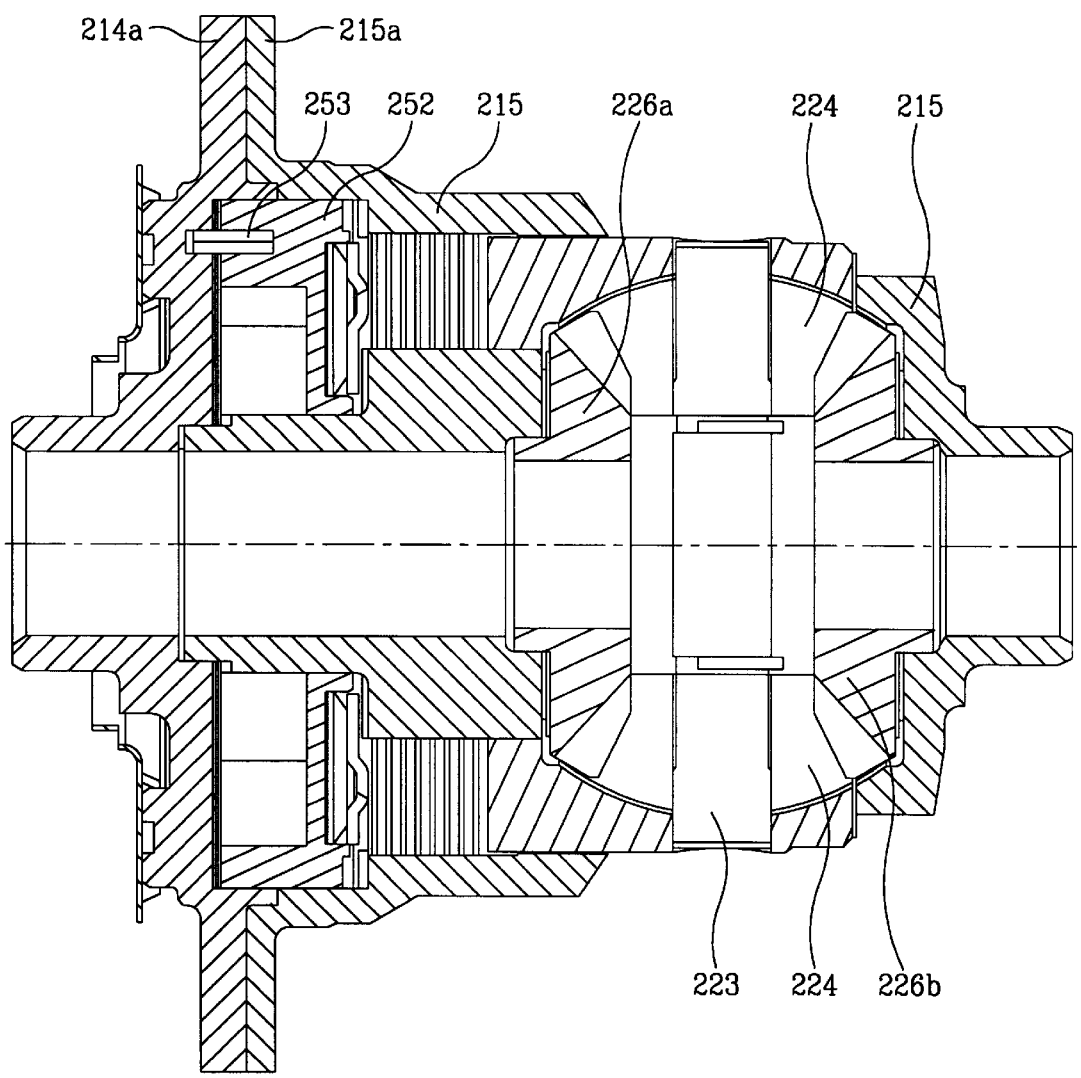
FIG. 8 is a sectional view of the differential and torque coupling assembly as viewed along section line VIII—VIII of FIG. 6.
Figure 9:
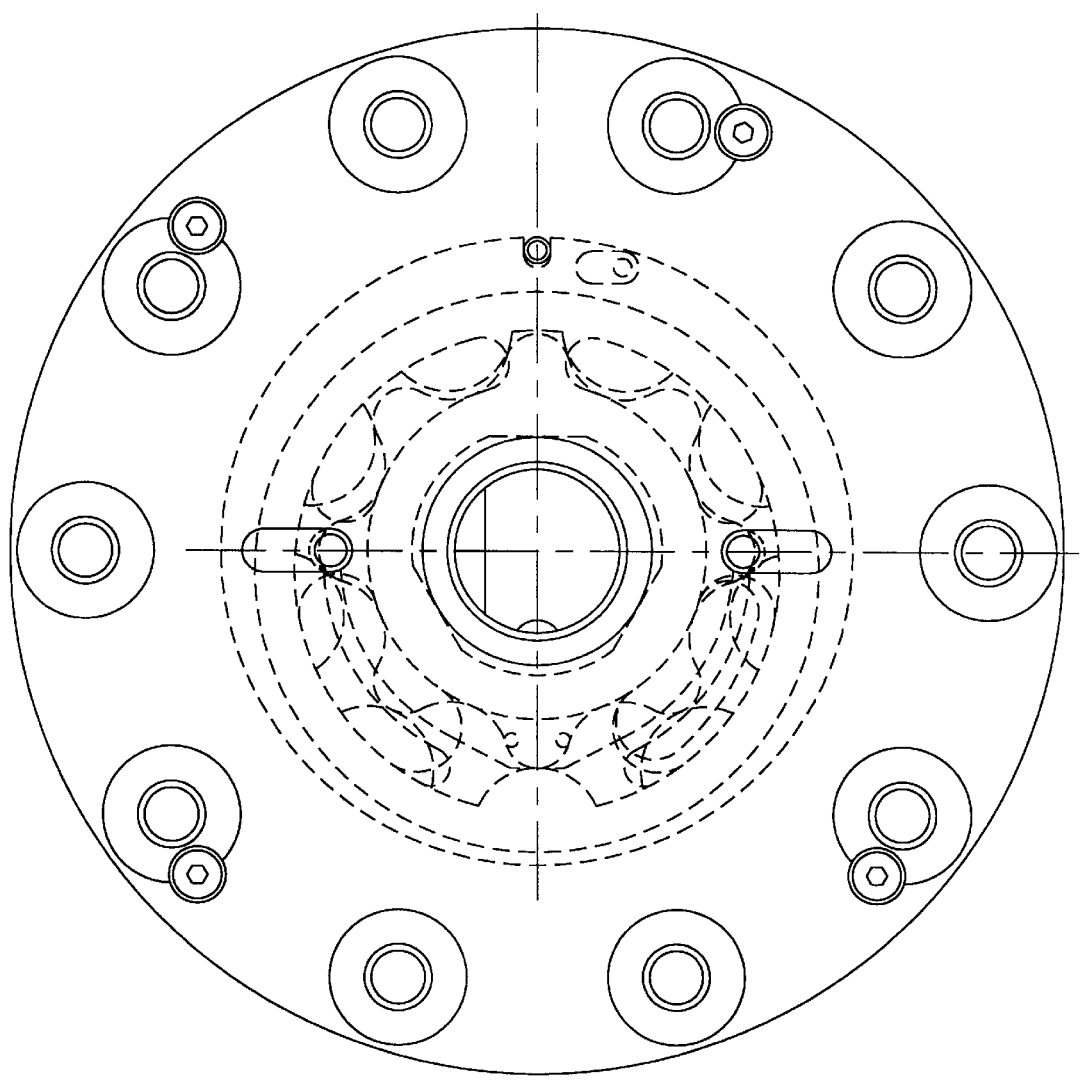
FIG. 9 is left end view of the differential and torque coupling assembly as shown in FIG. 5 with components of the pump actuator shown in dotted lines.

FIG. 7 is a cross sectional view of the torque coupling differential as viewed along section line VII—VII of FIG. 6, and FIG. 8 is a cross sectional view of the torque coupling differential as viewed along section line VIII—VIII of FIG. 6. FIG. 9 is left end view of the differential and torque coupling assembly as shown in FIG. 5 with components of the pump actuator shown in dotted lines.

FIGS. 6–8 show the components of the torque coupling mechanism disposed between the ring gear sub-assembly 210 and the differential sub-assembly 220. The ring gear 212 has been omitted from FIGS. 4–8. The differential assembly shown in cross section includes the differential case 222, pinion gears 224a, 224b and side gears 226a, 226b, wherein the pinion gears 224a, 224b are mounted on the shaft 223.

Disposed adjacent the side gear 226a is an inner clutch sleeve 242 having external splines 242a. A clutch pack is disposed between the ring gear sub-assembly 210 and the differential sub-assembly 220. Forming the clutch pack are clutch plates 244 and 245 alternately mounted between the inner clutch sleeve 242 and the outer housing 215. The clutch plates 244 mate with the splines 215b formed on the clutch sleeve 242, and the clutch plates 245 mates with splines 215b formed on the inner surface of the outer housing 215. The clutch plates 244 frictionally engage the clutch plates 245 to form a torque coupling arrangement between the ring gear sub-assembly 210 and the differential sub-assembly 220. Torque is transferred from the ring gear to the outer housing 215, then to the clutch plates 245. The clutch plates 245 transmit torque to the clutch plates 244 which, in turn, transmit torque to the clutch sleeve 242. The clutch sleeve 242 then transmits torque to the differential case 222.

A speed sensitive fluid pump arrangement 250 actuates the clutch pack to increase the frictional engagement between the clutch plates 244, 245. The speed sensitive fluid pump arrangement 250 comprises an outer ring member 252, an outer rotor 254 and an inner rotor 256. The inner rotor 256 mates with the clutch sleeve 242, and the outer ring member 252 mates with the ring gear sub-assembly 210 via pin 253.

Figure 10:
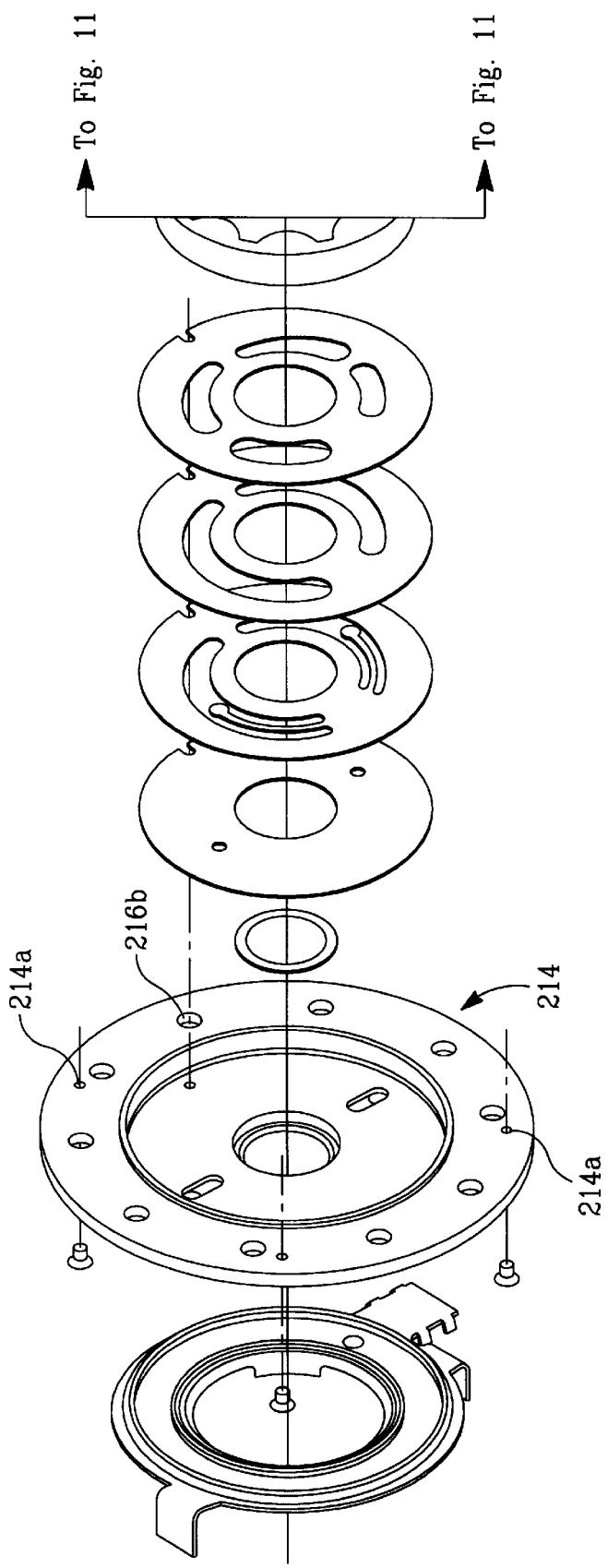
FIGS. 10–13 are exploded views of the primary components of one embodiment of the present invention.
Figure 11:
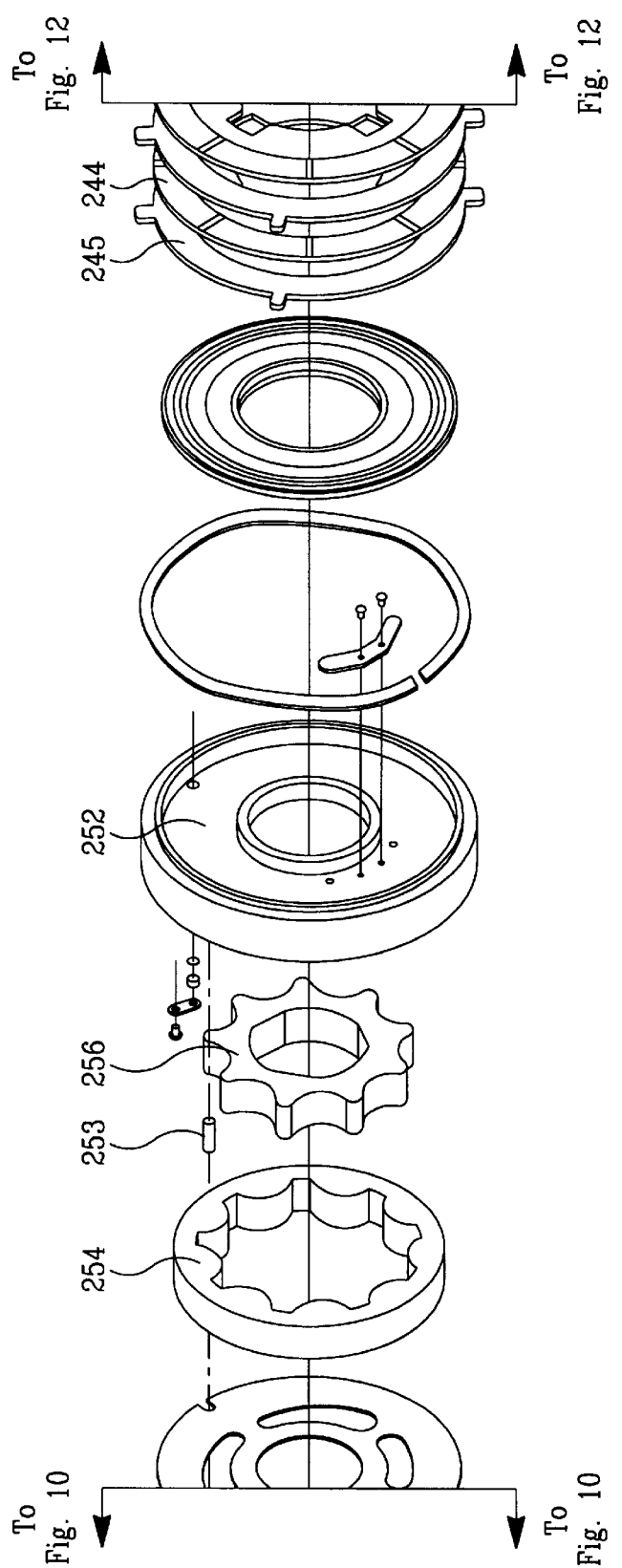
Figure 12:
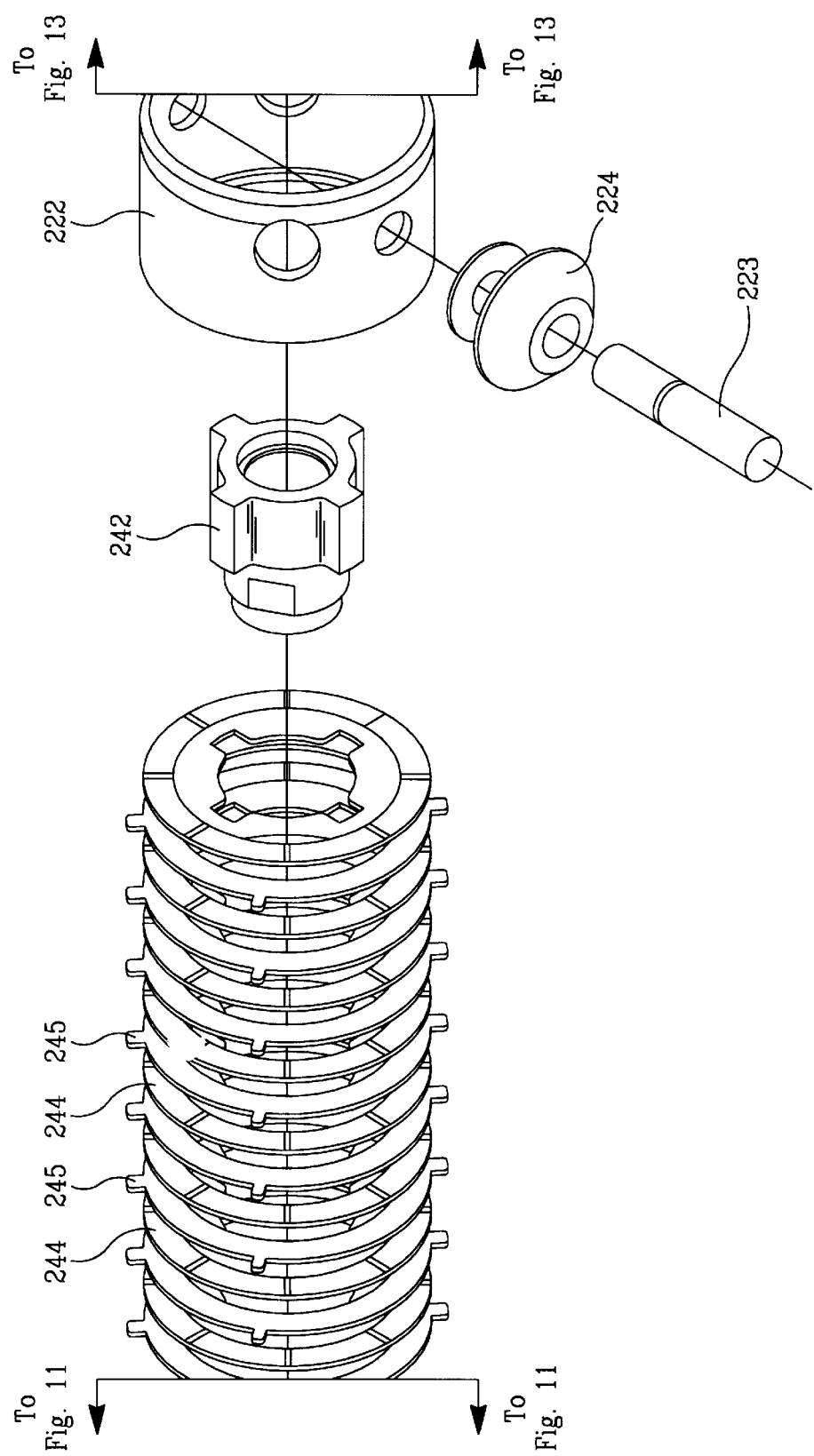
Figure 13:
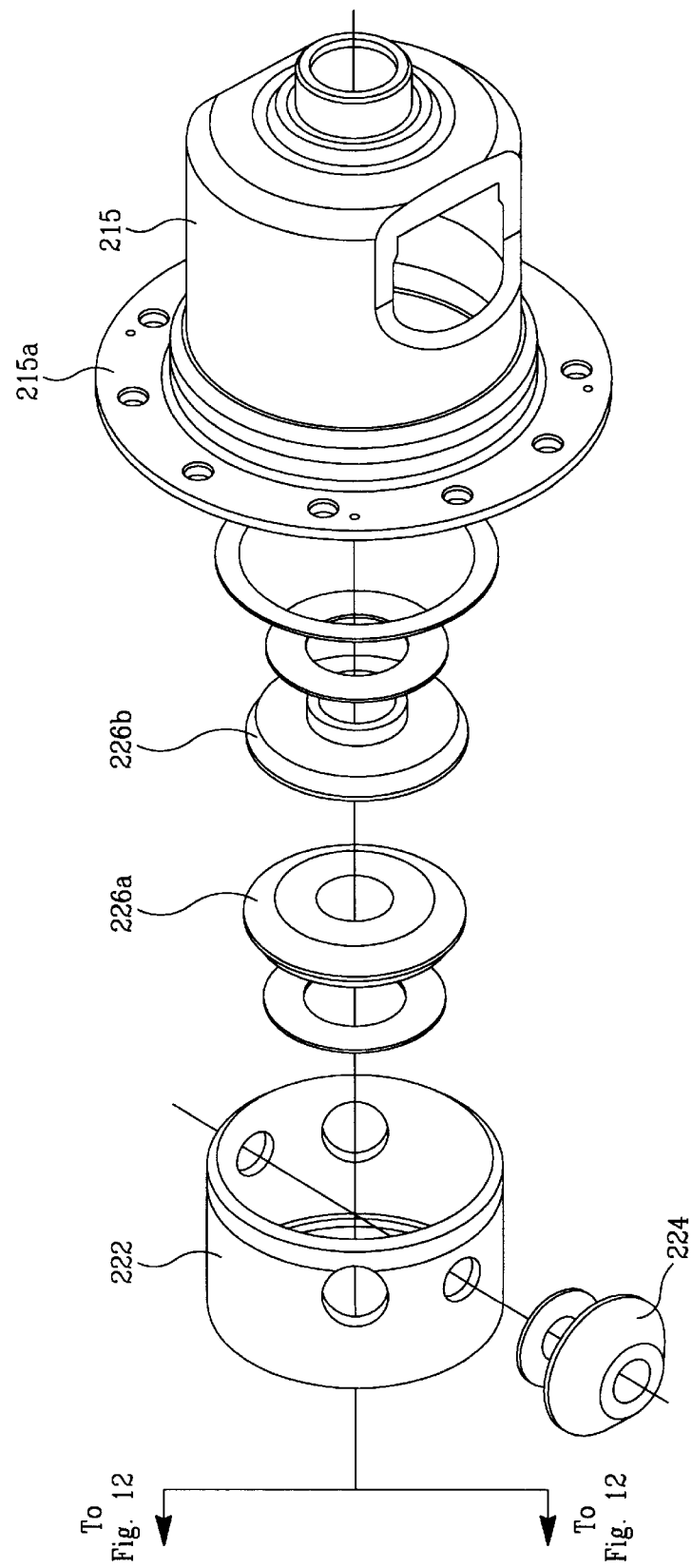

As illustrated in FIG. 10, the inner rotor 256 has one less tooth than the outer rotor 254 and when the inner rotor 256 is driven it will drive the outer rotor 254, which can freely rotate within the outer ring member 252 thus providing a series of decreasing and increasing volume fluid pockets by means of which fluid pressure is created.

External to the pump itself, the inner rotor 256 is matingly connected to the clutch sleeve 242, and the sleeve 242 meshes with clutch plates 244. When relative motion takes place between ring gear sub-assembly 210 and the differential sub-assembly 220, the clutch sleeve 242 will rotate the inner rotor 256 of pump 250 to create fluid pressure.

The torque transmission coupling provided in accordance with the present invention comprises the ring gear sub-assembly 210, the differential sub-assembly 220, the friction clutch mechanism 260, and the oil pump 250 for engaging the clutch mechanism depending on the rotation speed difference between the ring gear sub-assembly 210 and the differential sub-assembly 220. Therefore, the torque coupling is an improvement over the conventional center differential unit of the full time-four-wheel-drive vehicle, the cost of production of the coupling is very low, and the weight of the four-wheel-drive vehicle provided in accordance with the present invention is reduced.

When the front wheel system of the four-wheel-drive vehicle provided in accordance with the present invention is driven by the first differential means, torque is transmitted to the rear wheels at the side of the second differential means as long as the front wheels are not locked at the sharp braking of the vehicle. For that reason, an anti-locking effect is produced. In other words, the torque is transmitted to the rear wheels from the front wheels through the torque transmission coupling. This serves to prevent the early locking of the rear wheels, which would be likely to occur at the time of braking on a low-friction-coefficient road such as an icy road.

As described above, the four-wheel-drive vehicle provided in accordance with the present invention fulfills the functions of four-wheel drive well through the action of the compact, lighter weight torque transmission coupling which does not need an electronic controller of high production cost and whose constitution is relatively simple, so that the cost of production of the coupling is lower. Of course, an electronic controller may be employed in conjunction with the torque coupling differential assembly described herein, whereby the fluid pump is eliminated in favor of an electronic controller or other suitable type of controller for the clutch mechanism or other torque transfer mechanism.

While the foregoing invention has been shown and described with reference to a specific arrangement and design, it will be understood by those of skill in the art that various changes in form and detail may be made therein without departing from the spirit and scope of this invention.

I claim:

1. A torque transmission coupling for an axle of a four-wheel-drive vehicle, said torque transmission coupling comprising:

a two-piece differential case having a first piece and a second piece;

a ring gear secured to and transmitting an input torque to said first piece;

at least one pinion and side gear assembly secured to and receiving an output torque from said second piece;

a multi-disc clutch mechanism adapted to transmit torque from said first piece to said second piece when said multi-disc clutch mechanism is in an engaged position, a first set of clutch plates being secured to said first piece and a second set of clutch plates being secured to said second piece; and a speed sensitive pump actuation system responsive to a relative rotation between said first piece and said second piece to thereby actuate said multi-disc clutch mechanism, wherein both said speed sensitive pump actuation system and said clutch mechanism are disposed within said differential case enclosing a differential assembly.

2. The torque transmission coupling according to claim 1, wherein said ring gear input member is fastened to an outer differential housing assembly that encapsulates at least a portion of said second piece of said two-piece differential.

3. The torque transmission coupling according to claim 1, wherein said differential case output member drives at least one pinion and side gear assembly.

4. The torque transmission coupling according to claim 1, further comprising a bearing assembly providing relative rotation between said first piece and said second piece.

5. The torque transmission coupling according to claim 1, wherein said second piece of said two-piece differential case is formed as a cup-shaped member.

6. The torque transmission coupling according to claim 1, wherein said clutch mechanism is coaxially arranged with respect to a rotational axis of said output member.

7. The torque transmission coupling according to claim 1, wherein said speed sensitive pump actuation system comprises a gerotor pump delivering pressurized fluid to said friction clutch mechanism.

8. The torque transmission coupling according to claim 7, wherein said at least one pinion and side gear assembly comprises a planetary differential assembly selectively transmitting torque to a pair of coaxially arranged axles, and wherein said gerotor pump is coaxially disposed with respect to said axles.

9. The torque transmission coupling according to claim 1, wherein said clutch mechanism comprises at least one input friction plate rotationally fixed with respect to said first piece and at least one output friction plate rotationally fixed with respect to said second piece, said input friction plate adapted to contact said output friction plate when actuated by said speed sensitive pump actuation system.

10. The torque transmission coupling according to claim 1, wherein said speed sensitive actuation system comprises:

a first rotary member rotated together with said first piece; and a second rotary member which is provided on said second piece facing said first rotary member so as to be rotated together with said second piece;

wherein pressure of an enclosed oil is increased by the relative rotation between said first rotary member and said second rotary member during said relative rotation so that said oil is supplied to said clutch mechanism.

* * * * *